United States Patent
Jung et al.

(10) Patent No.: US 10,366,238 B2
(45) Date of Patent: Jul. 30, 2019

(54) SECURE BOOT FOR MULTI-CORE PROCESSOR

(71) Applicant: Microsoft Technology Licensing, LLC, Redmond, WA (US)

(72) Inventors: Jaeyeon Jung, Bellevue, WA (US); Felix Stefan Domke, Luebeck (DE); Ryan J. Fairfax, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/632,388

(22) Filed: Jun. 25, 2017

(65) Prior Publication Data
US 2018/0373878 A1 Dec. 27, 2018

(51) Int. Cl.
G06F 21/57 (2013.01)
G06F 9/4401 (2018.01)
H04L 9/06 (2006.01)
H04L 9/08 (2006.01)
H04L 9/14 (2006.01)
H04L 9/32 (2006.01)

(52) U.S. Cl.
CPC .......... *G06F 21/575* (2013.01); *G06F 9/4406* (2013.01); *H04L 9/0643* (2013.01); *H04L 9/0894* (2013.01); *H04L 9/14* (2013.01); *H04L 9/3247* (2013.01); *G06F 2221/034* (2013.01)

(58) Field of Classification Search
CPC ... G06F 21/575; G06F 9/4406; H04L 9/0643; H04L 9/0894; H04L 9/14
See application file for complete search history.

(56) References Cited

U.S. PATENT DOCUMENTS

| 6,990,579 B1 | 1/2006 | Herbert et al. |
| 7,613,921 B2 | 11/2009 | Scaralata |
| 8,397,299 B2 | 3/2013 | Herschaft |
| 8,812,871 B2 | 8/2014 | Monclus et al. |
| 9,348,997 B2 | 5/2016 | Schulz et al. |
| 9,405,912 B2 | 8/2016 | Novak et al. |
| 9,443,111 B2 | 9/2016 | Offenberg et al. |

(Continued)

FOREIGN PATENT DOCUMENTS

WO 2014088239 A1 6/2014

OTHER PUBLICATIONS

"Storing a secure key in an embedded device's memory", https://electronics.stackexchange.com/questions/198274/storing-a-secure-key-in-an-embedded-devices-memory, Retrieved on: Jun. 12, 2017, 4 pages.

(Continued)

*Primary Examiner* — Arvin Eskandarnia
(74) *Attorney, Agent, or Firm* — Davin Chin; Chin IP, PLLC

(57) ABSTRACT

The disclosed technology is generally directed to a secure boot mechanism for a multi-core system. In some examples, multiple execution environments may be sequentially booted according to a chain of trust that corresponds to the defense-in-depth hierarchy. A first stage of the secure boot may be based on the hardware root of trust of the multi-core processor. Subsequent stages may be based upon the trust in the previous stages. In some examples, if any stage is determined to be compromised, then the secure boot ceases, and neither the stage determined to be compromised nor any subsequent stages are booted.

20 Claims, 6 Drawing Sheets

(56) References Cited

U.S. PATENT DOCUMENTS

| | | | |
|---|---|---|---|
| 9,594,927 | B2 | 3/2017 | Zimmer et al. |
| 9,674,162 | B1 | 6/2017 | Miller et al. |
| 2006/0031175 | A1 | 2/2006 | Sellars et al. |
| 2006/0179302 | A1 | 8/2006 | Hatakeyama |
| 2007/0192610 | A1 | 8/2007 | Chun et al. |
| 2008/0256366 | A1 | 10/2008 | Dale et al. |
| 2010/0031012 | A1 | 2/2010 | Rotondo et al. |
| 2011/0040957 | A1 | 2/2011 | Berger et al. |
| 2014/0157002 | A1 | 6/2014 | Grobman et al. |
| 2014/0195848 | A1 | 7/2014 | Teli et al. |
| 2014/0281455 | A1 | 9/2014 | Kochar |
| 2014/0325239 | A1* | 10/2014 | Ghose .................. G06F 9/3851 713/190 |
| 2015/0036513 | A1 | 2/2015 | Bukin |
| 2015/0261950 | A1 | 9/2015 | Schulz et al. |
| 2015/0339129 | A1 | 11/2015 | Divakaran et al. |
| 2016/0124481 | A1 | 5/2016 | Avadhanam et al. |
| 2016/0125187 | A1* | 5/2016 | Oxford ................ G06F 21/575 713/2 |
| 2017/0083707 | A1 | 3/2017 | Woolley et al. |
| 2017/0085383 | A1 | 3/2017 | Rao et al. |
| 2017/0093800 | A1 | 3/2017 | Wiseman et al. |
| 2017/0103209 | A1 | 4/2017 | Wooten et al. |
| 2017/0286279 | A1 | 10/2017 | Allison et al. |
| 2018/0006815 | A1* | 1/2018 | Young .................. G06F 21/575 |
| 2018/0189493 | A1* | 7/2018 | Schilder ........... G01R 31/31858 |
| 2018/0341620 | A1 | 11/2018 | Letey et al. |

OTHER PUBLICATIONS

Arrag, et al., "Replace AES Key Expansion Algorithm by Modified Genetic Algorithm", In Proceedings of Applied Mathematical Sciences, vol. 7, No. 144, 2013, pp. 7161-7171.

Domke, Felix Stefan et al.; "Remote Attestation for Multi-Core Processor"; U.S. Appl. No. 15/632,380, filed Jun. 25, 2017; 43 pages.

Domke, Felix Stefan et al.; "Secure Key Storage for Multi-Core Processor"; U.S. Appl. No. 15/632,383, filed Jun. 25, 2017; 42 pages.

Huang, et al., "An Effective Approach for Remote Attestation in Trusted Computing", In Proceedings of the 2nd International Symposium on Web Information Systems and Applications, May 22, 2009, pp. 80-83.

Jumelet, et al., "Control the health of Windows 10-based devices", https://docs.microsoft.com/en-us/windows/device-security/protect-high-value-assets-by-controlling-the-health-of-windows-10-based-devices, Published on: Apr. 5, 2017, 42 pages.

Presti, Stephane Lo, "A Tree of Trust rooted in Extended Trusted Computing", In Proceedings of the second conference on Advances in Computer Security and Forensics Programme, Jul. 2007, pp. 1-8.

Smeets, Ben, "System Security Ii: Trusted Computing", https://www.ida.liu.se/~TDDD17/lectures/slides/tddd17-system-security-2-trusted-computing-2017.pdf, Published on: Feb. 11, 2017, 42 pages.

Vernon, Richard C., "A design for sensing the boot type of a trusted platform module enabled computer", In Thesis of University of Arkansas, Sep. 2005, 69 pages.

Yan, et al., "A software-based root-of-trust primitive on multicore platforms", In Proceedings of the 6th ACM Symposium on Information, Computer and Communications Security, Mar. 22, 2011, pp. 334-343.

"Secure Boot", In White Paper of Freescale, Dec. 13, 2016, 4 pages.

David, Czagan, "Using Hashes in Securityhashes-in-Computer-Security", Retrieved from: https://resources.infosecinstitute.com/hashes-in-computer-security/#gref, Sep. 30, 2013, 3 Pages.

"International Search Report and Written Opinion Issued in PCT Application No. PCT/US18/035238", dated Jul. 25, 2018, 13 Pages.

"International Search Report and Written Opinion Issued in PCT Application No. PCT/US18/035236", dated Aug. 13, 2018, 16 Pages.

"Non Final Office Action Issued in U.S. Appl. No. 15/632,380", dated Nov. 16, 2018, 9 Pages.

"Non Final Office Action Issued in U.S. Appl. No. 15/632,383", dated Feb. 19, 2019, 11 Pages.

"Final Office Action Issued in U.S. Appl. No. 15/632,380", dated May 3, 2019, 9 Pages.

* cited by examiner

US 10,366,238 B2

SECURE BOOT FOR MULTI-CORE PROCESSOR

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to a secure boot mechanism. In one example of the technology, a global public key is used to validate a first boot loader. Upon validating the first boot loader, the first boot loader may be booted. A secret device key may be mutated based on a hash of the first boot loader to derive a first mutated key. A second mutated key may be derived from the first mutated key. A hash of a runtime of a first core may be calculated. The runtime of the first core may be validated by: validating the calculated hash of the runtime of the first core against a stored hash of the runtime of the first core, and validating a signature for the runtime of the first core. Upon validation of the runtime of the first core, the runtime of the first core may be booted.

A hash of a runtime of a first execution environment of a second core may be calculated. The runtime of the first core may validate the runtime of the first execution environment of the second core by: validating the calculated hash of the runtime of the first execution environment of the second core against a stored hash of the runtime of the first execution environment of the first core, and validating a signature for the runtime of the first execution environment of the second core. The signature of the runtime of the first execution environment for the second core may be based on a key that is retrieved from a secure key store and that is at least one of decrypted or validated with the second mutated key. Upon validation of the runtime of the first execution environment of the second core, the runtime of the first execution environment of the second core may be booted.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
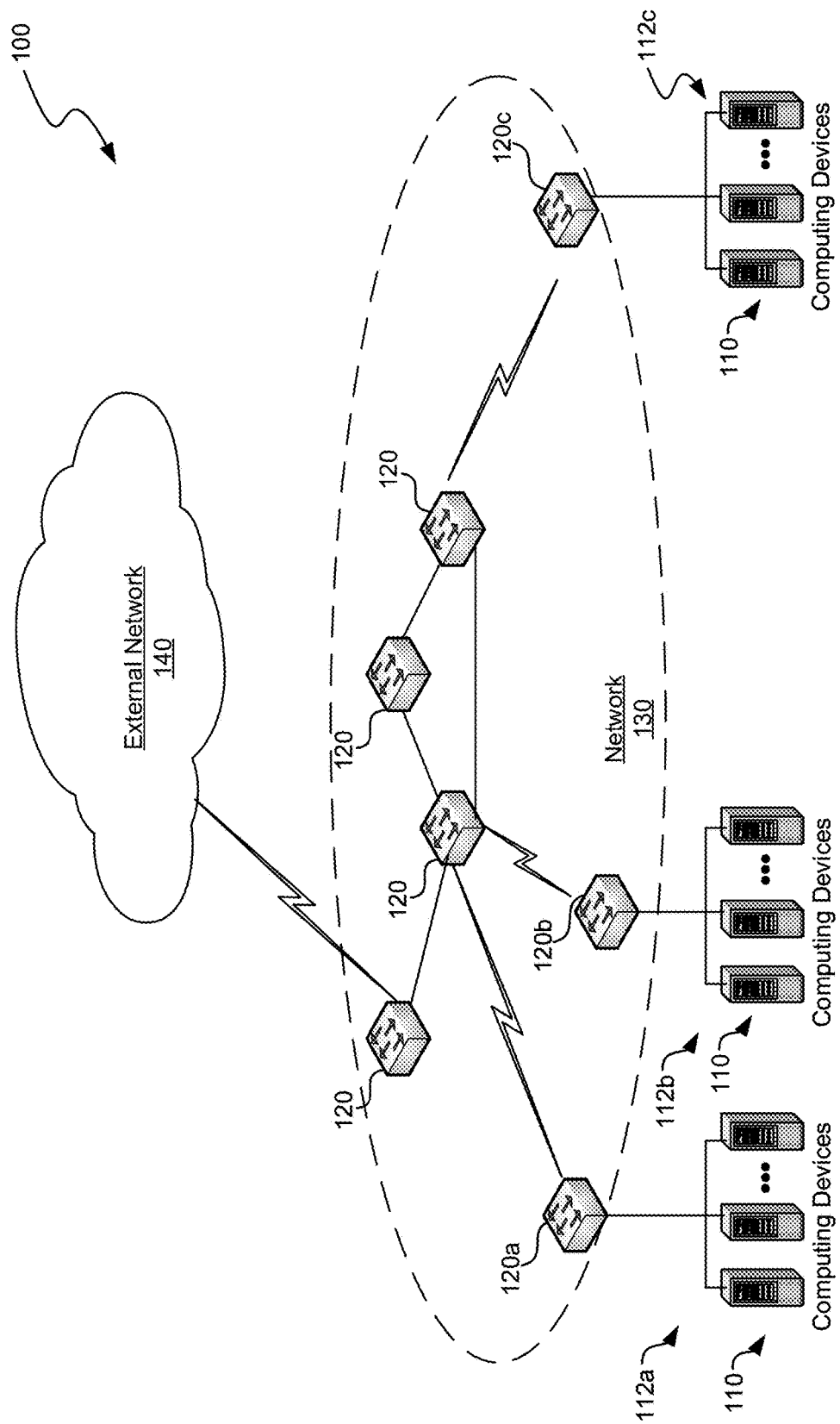
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to a secure boot mechanism. In one example of the technology, a global public key is used to validate a first boot loader. Upon validating the first boot loader, the first boot loader may be booted. A secret device key may be mutated based on a hash of the first boot loader to derive a first mutated key. A second mutated key may be derived from the first mutated key. A hash of a runtime of a first core may be calculated. The runtime of the first core may be validated by: validating the calculated hash of the runtime of the first core against a stored hash of the runtime of the first core, and validating a signature for the runtime of the first core. Upon validation of the runtime of the first core, the runtime of the first core may be booted.

A hash of a runtime of a first execution environment of a second core may be calculated. The runtime of the first core may validate the runtime of the first execution environment of the second core by: validating the calculated hash of the runtime of the first execution environment of the second core against a stored hash of the runtime of the first execution environment of the first core, and validating a signature for the runtime of the first execution environment of the second core. The signature of the runtime of the first execution environment for the second core may be based on a key that is retrieved from a secure key store and that is at least one of decrypted or validated with the second mutated key. Upon validation of the runtime of the first execution environment of the second core, the runtime of the first execution environment of the second core may be booted.

A multi-core processor may be used in IoT devices and in other contexts. In some examples, the multi-core processor may provide network connectivity, for the IoT device, as well as various other functions including hardware and software security, a monitored operating system, cryptographic functions, peripheral control, telemetry, and/or the like.

Some examples of multi-core processors may include, for example, one or more microcontrollers and one or more CPUs, and some of the cores may have multiple independent execution environments, such as a secure world execution environment and a normal world execution environment, whereas some cores may each have one independent execution environment. In some examples, the independent execution environments are configured to have a defense in depth hierarchy.

Some examples of a multi-core processor boot with a secure boot mechanism that includes a chain of trust. The chain of trust may operate in accordance with the defense-in-depth hierarchy used in the multi-core processor.

In some examples, the independent execution environments in the multi-core processor are arranged in a hierarchy of defense-in-depth based on trust, with different functions assigned to different layers of the hierarchy, so that the layer of the hierarchy assigned to the function is responsible for the function. Examples of the different functions may include power, storage, Wi-Fi, real-time clock write access, and/or the like. In some examples, independent execution environments lower in the hierarchy that the independent execution environment to which the function is assigned cannot access the function except by making a request to the independent execution environment that is assigned to the function. In some examples, even in the case of making a request, the independent execution environment that is lower in the hierarchy still does not itself have access; rather, it can only request that the independent execution environment that is assigned to the function perform such actions related to the function.

In some examples, the multi-core processor may operate with a secure boot mechanism, e.g., to ensure that only trusted software is booted. In some examples, each layer in the defense-in-depth hierarchy sequentially launches in turn as a chain of trust that corresponds to the defense-in-depth hierarchy. The first stage of the secure boot may be based on the hardware root of trust of the multi-core processor. Subsequent stages may be based upon the trust in the previous stages. In some examples, if any stage is determined to be compromised, then the secure boot ceases, and neither the stage determined to be compromised nor any subsequent stages are booted.

In some examples, a per-device key is mutated and used for validation of the first independent execution environment. In some examples, each independent execution environment is validated before it is booted, and the validation is performed by the stage preceding it in trust, based in part on the validation of the previous stage.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment Dm can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT hub, a device comprising part or all of an application back-end, or the like, as discussed in greater detail below.

Illustrative Computing Device

Figure 2:
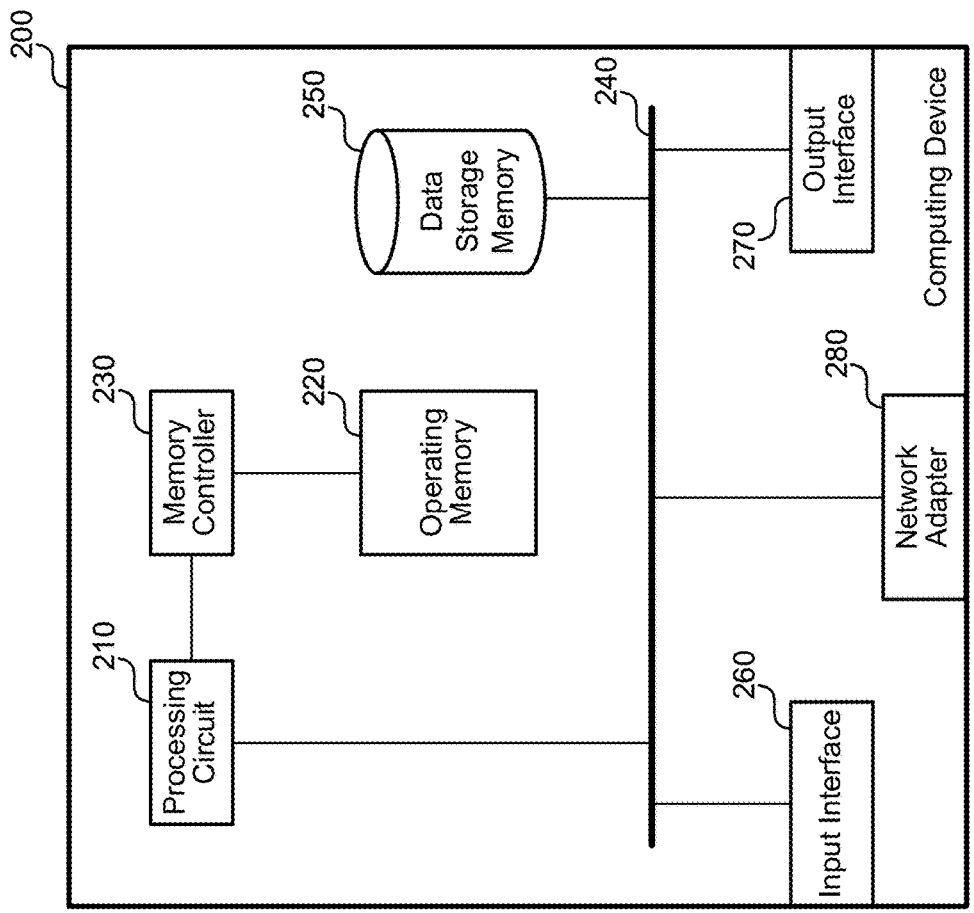
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage memory 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudostatic random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
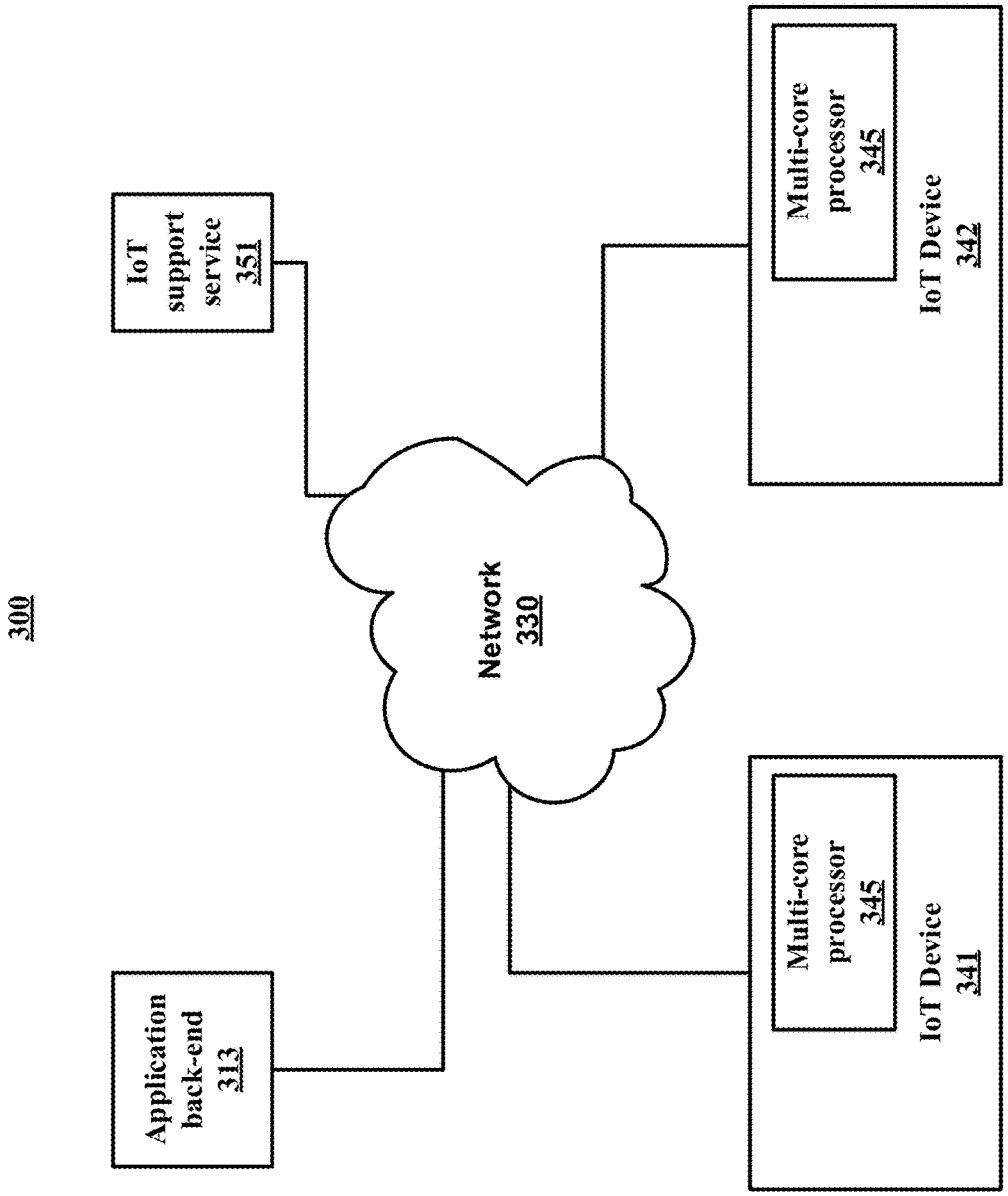
FIG. 3 is a block diagram illustrating an example of a system.

FIG. 3 is a block diagram illustrating an example of a system (300). System 300 may include network 330, IoT support service 351, IoT devices 341 and 342, and application back-end 313, which all connect to network 330. The term "IoT device" refers to a device intended to make use of IoT services. An IoT device can include virtually any device that connects to the cloud to use IoT services, including for telemetry collection or any other purpose. IoT devices include any devices that can connect to a network to make use of IoT services. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, and/or personalization of settings. However, the foregoing list merely includes some of the many possible users for IoT services. Such services may be employed for, or in conjunction with, numerous other applications, whether or not such applications are discussed herein.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. In some examples, at least some of the actions taken by the application back-end may be performed by applications running in application back-end 313.

The term "IoT support service" refers to a device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service.

Each of the IoT devices 341 and 342, and/or the devices that comprise IoT support service 351 and/or application back-end 313 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. The IoT support service is in the cloud, whereas the IoT devices are edge devices. FIG. 3 and the corresponding description of FIG. 3 in the specification illustrates an example system for illustrative purposes that does not limit the scope of the disclosure.

One or more of the IoT devices 341 and 342 may include a multi-core processor 345. Each multi-core processor 345 may have a secure boot mechanism using cross-core validation and multiple mutations of a secret device key, with sequentially booting using a chain of trust that corresponds to a defense-in-depth hierarchy of multi-core processor 345, as discussed in greater detail below.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT support service 351, IoT devices 341 and 342, and application back-end 313. Although each device or service is shown connected as connected to network 330, that does not mean that each device communicates with each other device shown. In some examples, some devices/services shown only communicate with some other devices/services shown via one or more intermediary devices. Also, other network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341 and 342 are devices that are intended to make use of IoT services provided by the IoT support service, which, in some examples, includes one or more IoT support services, such as IoT support service 351. Application back-end 313 includes a device or multiple devices that perform actions in providing a device portal to users of IoT devices.

System 300 may include more or less devices than illustrated in FIG. 3, which is shown by way of example only.

Also, FIG. 3 illustrates one example application for a multi-core processor, namely, use in an IoT device. Multi-core processors 345 may also be used in various other suitable applications and contexts other than in an IoT device and/or in an IoT context.

Illustrative Multi-Core Processor

Figure 4:
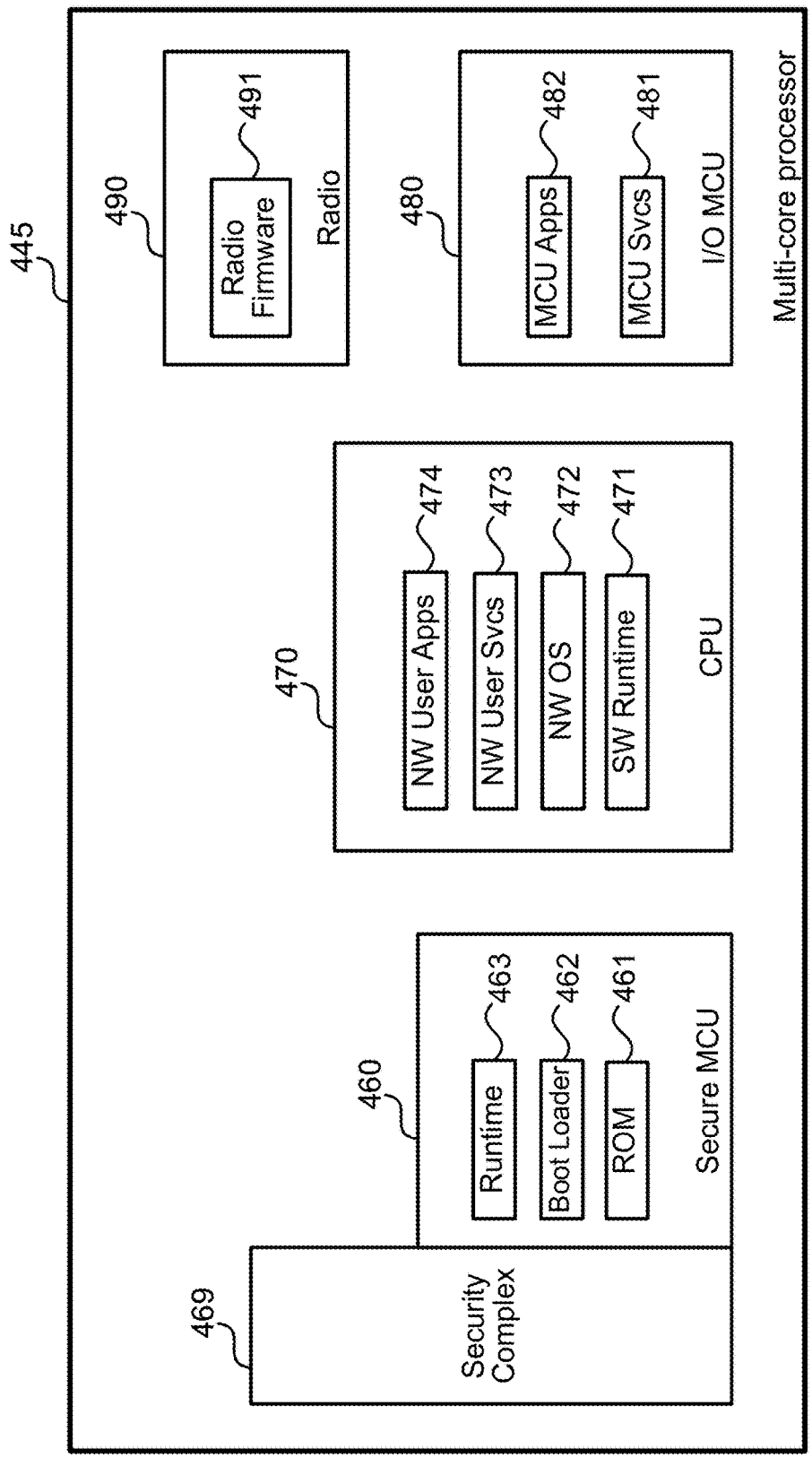
FIG. 4 is a block diagram illustrating an example of the multi-core processor of FIG. 3.

FIG. 4 is a diagram illustrating an example of a multi-core processor 445 with defense-in-depth architecture. FIG. 4 and the corresponding description of FIG. 4 in the specification illustrate an example processor for illustrative purposes that do not limit the scope of the disclosure.

In some examples, multi-core processor 445 enables a device in which multi-core processor 445 is included to operate as an IoT device, such as IoT device 341 or 342 of FIG. 3. In some examples, multi-core processor 445 may have at least 4 MB of RAM and at least 4 MB of flash memory. However, this is merely an example of one possible implementation. Other processors may include various combinations of less, or more, RAM and/or flash memory. In some examples, multi-core processor 445 provides not just network connectivity, but various other functions including hardware and software security, a monitored operating system, cryptographic functions, peripheral control, telemetry, and/or the like. In addition, multi-core processor 445 may include technology for allowing the device to be booted in a secure manner, allowing the device to be securely updated, ensuring that proper software is running on the device, allowing the device to function correctly as an IoT device, and/or the like.

Multi-core processor 445 is arranged as follows in some examples. Multi-core processor 445 includes security complex 469, secure microcontroller (MCU) 460, general purpose CPU 470, at least one input/output (I/O) MCU 480, and radio core 490. Secure MCU 460 may include secure MCU read-only memory (ROM) 461, secure MCU first bootloader 462, and secure MCU runtime 463. CPU 470 may be an application processor that includes Secure World (SW) runtime 471, Normal World operating system (OS) 472 that operates in supervisor mode, Normal World user-mode services 473, and Normal World user-mode applications 474. Each I/O MCU 480 may include MCU services 481 and MCU applications 482. Radio core 490 may include radio firmware 491.

In some examples, security complex 469 is the hardware root of trust in multi-core processor 469. In some examples, security complex 469 is directly connected to secure MCU 460. In some examples, secure MCU 460 has a very high degree of trust, but is less trusted than security complex 469. In these examples, secure MCU 460 controls one or more functions that require a very high degree of trust. In one example, secure MCU 460 controls power for multi-core processor 445 and/or an IoT device.

In some examples, CPU 470 runs a high-level operating system. In some examples, CPU 470 has two independent execution environments: a Secure World (SW) runtime 471 and a Normal World execution environment. The term "Secure World" is used broadly to refer to a trusted environment and is not limited to a particular security feature. In some examples, the Secure World runtime 471 of CPU 470 is also part of the trusted computing base of the system. In some examples, the Secure World runtime 471 of CPU 470 does not, however, have access to the internals of core security complex 469 and relies on secure MCU runtime 463 for particular security-sensitive operations.

The Normal World execution environment of the CPU 470 may be configured to have limited access to such on-chip resources as memories. In some examples, the code running in this environment must still meet certain (e.g., relatively high) standards of security and quality but is less trusted than either the code running on the secure MCU 460 or the code running in Secure World runtime 471 on the CPU 470.

In some examples, the I/O MCU cores 480 are less trusted than the secure MCU 460 and CPU 470, and as such, in some examples the CPU's Secure World environment is responsible for configuring the firewalls of multi-core processor 445 to limit the access of I/O MCU 480 to on-chip resources.

In some examples, radio core 490 executes vendor-provided firmware. The radio core 490 may provide radio functionality and connectivity to the Internet and cloud services such as IoT services. In some examples, radio core 490 may provide communications via Wi-Fi, Bluetooth, and/or other connectivity technology. But as with the I/O MCU 480, in some examples, the CPU 470 is responsible for configuring the firewalls to limit the access of radio core 490 to on-chip resources. In some examples, radio core 490 does not have any access to unencrypted secrets, and is not capable of compromising the execution of secure MCU 460 or the CPU 470.

In some examples, each independent execution environment is managed by a single software component executing in a separate execution environment that is referred to the "parent" of the execution environment. In such examples, one exception may be that the hardware root of trust (security complex 469 in this example) has no parent. In one particular example, each parent executes in an environment that is at least as trusted as the environments it manages. In other examples, other suitable means of security may be employed. Management operations may include booting and resuming the target environment, monitoring and handling resets in the target environment, and configuring access policy for the target environment. In some cases, certain management operations are performed by a component other than a parent. For instance, in some examples, CPU's Normal World is the environment that manages I/O MCU 480, but receives assistance from CPU Secure World runtime 471 to do so (e.g. to configure firewalls, and to program the starting instructions of the I/O MCU 480).

For instance, in some examples, secure MCU runtime 473 manages Secure World runtime 472, a component in Secure World runtime 471 manages Normal World OS 472, a component in Normal World OS 472 manages Normal World user-mode services 473 and applications 474, and Normal World user-mode services 473 manages the I/O MCU 480 and the radio core 490.

In some examples, not only are independent execution environments managed by a software component from a more trusted execution environment, but different functions are assigned to the different independent execution environments, with more sensitive functions assigned to more trusted independent execution environments. In one particular example, independent execution environments less trusted than the independent execution environment to which it is assigned are restricted from having access to the function. In this way, the independent execution environments achieve defense-in-depth based on a hierarchy of trust. In other examples, other suitable means of security may be employed.

For instance, in some examples, security complex 469 is at the top of the hierarchy and is assigned to secrets (e.g., encryption keys), secure MCU runtime 463 is next in the hierarchy and is assigned to controlling power, Secure World runtime 471 is next in the hierarchy and is assigned to storage and to write access to a real time clock (RTC), Normal World OS 472 is next in the hierarchy and is assigned to managing radio functionality, Normal World user-mode applications 474 is next in the hierarchy and is assigned to applications, and the I/O MCU 480 are at the bottom of the hierarchy and are assigned to peripherals. In other examples, functions are assigned to independent execution environments in a different manner.

In some examples, each level of the hierarchy of trust except for the bottom (i.e., least trusted) level of the hierarchy has complete control to accept or reject any requests from a less trusted level, e.g., in terms of implementing support for the software they handle, and have the ability to rate limit or audit the requests from less trusted levels and to validate requests from lower levels to ensure that the requests correct and true. Also, as previously discussed, in some examples, each level of hierarchy except the top (i.e., most trusted) level has a parent that is responsible for managing the lower (i.e., less trusted) level, including monitoring the software of the lower level and ensuring that the software on the lower level is running correctly.

In some examples, the layers of the hierarchy make use of secure communications channels and firewalls. For instance, in some examples, secure MCU runtime 471 has two message queues, configured such that, based on the hardware, one of the queues can only be used in Secure World, and one that can be used from Normal World. In one particular example, if a message comes from the Secure World queue, then based on the hardware the message must have come from the Secure World, and is therefore more trusted than a message that came from Normal World. In other examples, other suitable means of security may be employed.

Additionally, in some examples, apart from the highest layer of the hierarchy, no layer of the hierarchy starts without a higher level of the hierarchy having validated the layer and, after validating the layer, allowed the layer to start. Also, in these examples, a layer of the hierarchy has the ability to stop any lower level of hierarchy, for example, at any time. Accordingly, in these examples, multi-core processor 445 has the software capability of each layer of the hierarchy having complete dominance over lower (i.e., less trusted) levels of the hierarchy in terms of stopping and starting and running of the lower levels of the hierarchy.

In some examples, security complex 469 is the hardware root of trust and the highest, most trusted level of the defense-in-depth trust hierarchy. In some examples, security complex 469 contains keys, secrets, encryption engines, and/or the like. In some examples, security complex 469 stores secrets, performs functions such as key generation, encryption, decryption, hashing, other cryptographic functions, other security-related functions, and/or the like. In some examples, security complex 469 is able to check the secret value stored in a one-way writable memory such as an e-fuse, one time programmable element, and/or the like.

In some examples, when multi-core processor 445 is powered on and its power management unit (PMU) has stable power, the PMU releases the security complex 469 from reset. In some examples, the security complex 469 is at the core of multi-core processor 445's trusted computing base. In some examples, core security complex 469 drives the secure boot process. In one particular example, cores are restricted from executing code until the security complex 469 has enabled it to do so. In other examples, other suitable means of security may be employed.

In some examples, execute in place (XiP) is not used on the secure MCU 460, in order to avoid the possibility of undetected runtime writes to flash resulting in untrusted code executing on secure MCU 460. In one particular example, the ROM 461 and runtime 463 instead ensure that code executing on secure MCU 460 is copied into the private SRAM of secure MCU 460 from flash and validated before executing. In other examples, other suitable means of security may be employed.

In some examples, the secure MCU 460 does not contain a memory management unit (MMU), but does contain a memory protection unit (MPU) that can be used to provide some safeguards—such as controlling the readability, writability, and executability of portions of the physical address space. The MPU may be used in this fashion, e.g. marking stacks and memory-mapped flash as no-execute.

In some examples, secure MCU ROM 461 is responsible for initializing enough of multi-core processor 445 so that the first piece of software stored in flash can securely execute on the secure MCU 460.

In some examples, upon entry, the code in secure MCU ROM 461 waits for indication that the secure MCU 460 has completed initialization, reads the e-fuse indicating the device's security state, configures Phase Locked Loops (PLLs) to set the desired steady-state, clock frequency, and enables memory mapping of flash (e.g., for all cores). In some examples, although the secure MCU 460 does not execute code directly from flash, it does leverage this mechanism to read and copy data from flash to its SRAM.

In these examples, after it has completed this configuration, the code in ROM 461 is responsible for loading and transferring control to secure MCU boot loader 462, which is the first-level boot loader of secure MCU 460. In some examples, secure MCU boot loader 462 is found in flash, both encrypted and signed, at known locations. In these examples, the ROM code validates the code, and loads it into the private SRAM of secure MCU 460. In some examples, secure MCU boot loader 462 contains the first instruction of non-ROM code executed on Multi-core processor 445, and is a fixed size (e.g., 16 k) raw binary. In some examples, secure MCU boot loader 462 is responsible for loading, validating, and transferring control to the secure MCU Runtime 463, setting up the device's software key store, implementing a low-level "recovery mode" for re-programming flash (used for development purposes, and possibly also for in-the-field updates—appropriately secured), applying updates/rollbacks, and configuring and kicking a secure watchdog timer in secure MCU 460 (until the secure MCU runtime 463 takes control).

Much like the ROM code before it, in these examples, secure MCU boot loader 462 locates the secure MCU runtime code in flash, validates the code, loads the code into the private SRAM of secure MCU 460, and transfers control to the code. In some examples, once secure MCU boot loader 462 has transferred execution in this way, secure MCU boot loader 462 will not regain control, and secure MCU boot loader 462 will not remain resident in the SRAM of secure MCU 460 after secure MCU boot loader 462 has finished executing.

In some examples, secure MCU runtime 463 is responsible for managing the CPU's Secure World environment. In some examples, secure MCU is also responsible for managing and controlling power domains and other critical components, e.g., properly setting up debug enabling signals for other cores, powering on or off different domains on multi-core processor 445, re-configuring and kicking the own watchdog timer of secure MCU 460 (taking over for secure MCU boot loader), configuring the watchdog timer of CPU 470 and responding to its reset interrupt, and waking up a core (CPU 470 or I/O MCU 480) that has been powered off but received an interrupt. In some examples, secure MCU runtime 463 is responsible for monitoring Secure World runtime 471 of the CPU 470 to ensure that Secure World runtime 471 is running correctly and to reset Secure World runtime 471.

Secure MCU runtime 463 interacts with security complex 469 to request that core security complex 469 perform tasks associated with core security complex 469. For instance, secure MCU runtime 463 may request security complex 469 to extract keys, or to request that security complex 469 do something with the extracted keys, to request that security complex 469 generate a pin number, to request that something be encrypted by security complex 469 and the encrypted version returned to secure MCU runtime 463, and/or the like. In some examples, secure MCU runtime 463 acts in essence as the operating system for security complex 469.

Secure World on the CPU 470 may have a trust zone that creates a private independent execution environment that is hardware-protected from the rest of multi-core processor 445. Secure World may have a runtime, Secure World runtime 471. In some examples, the Secure World environment on the CPU 470 is part of multi-core processor 445's trusted computing base, and as such does not execute third-party code. For example, Secure World may have its own kernel and user mode processes. Secure World runtime 471 may be responsible for protecting security-sensitive hardware resources on multi-core processor 445, safely exposing limited access to these resources, and acting as a watchdog for the CPU 470's Normal World environment of Normal World OS 472, Normal World user services 473, and Normal World applications 474. For instance, in some examples, Secure World runtime 471 is responsible for monitoring Normal World OS 472, ensuring the Normal World OS 472 is running correctly, and resetting Normal World OS 472. In some examples, Secure World runtime 471 is responsible for forwarding requests to secure MCU 463 runtime from layers that do not have access to secure-MCU 463 runtime.

In some examples, the CPU 470 does not contain ROM code; instead, CPU 470 contains an 8-byte volatile memory that contains the first instruction(s) for it to execute upon being taken out of reset. In these examples, before the CPU 470 is taken out of reset, the 8-byte volatile memory is programmed by the secure MCU 460 to contain a branch to the first instruction of the CPU Secure World runtime 471, executing from shared SRAM. In some examples, CPU 470 is configured such that the code that executes in Secure World runtime 471 executes from a range of SRAM that is configured to be inaccessible to Normal World 472-474.

In some examples, Secure World runtime 471 is also responsible for booting Normal World environment on the CPU 470, exposing runtime services to software running in Normal World, access to real-time clock (RTC), I/O MCU 480 management API, radio core 490 management API, managing silicon components not accessible to Normal World (and which do not need to be managed by the secure MCU 460), interacting with the flash controller in macro mode, programming a direct memory access (DMA) engine of CPU Secure World 471, configuration of all firewalls, configuration of the core I/O mapping, handling interrupts indicating firewall violations, taking I/O MCU 480 and radio 490 cores out of reset, configuring watchdog timers for I/O MCU 480 cores, configuring the Real-time clock (RTC), and managing updates for certain software components. Because Secure World also contains multiple hardware modes (i.e. supervisor mode, user mode), the Secure World runtime 471 may internally span multiple modes for additional defense-in-depth.

In some examples, Secure World runtime 471 operates below secure-MCU runtime 463 in the trust/defense-in-depth hierarchy, but above Normal World OS 472 in the hierarchy. In these examples, whereas secure-MCU runtime 463 can, for instance, request that core security complex 469 generate a pin number, Secure World runtime 471 cannot. Also, in these examples, whereas secure-MCU runtime 463 has access to power, Secure World runtime 471 does not. However, in these examples, Secure World runtime 471 is in charge of managing storage, and layers of the hierarchy below Secure World runtime 471 do not have access to storage.

As discussed, in some examples, the Secure World environment of CPU 470 is a hardware-protected private execution environment of CPU 470. The rest of the software environment of CPU 470, other than the Secure World environment, is the Normal World environment. There are registers that the Secure World can read but the Normal World cannot in some examples. The Normal World environment may include a supervisor mode and a user mode. The supervisor mode of the Normal World environment of CPU 470 may include Normal World OS 472. The user mode of the Normal World environment of CPU 470 may include Normal World user services 473 and Normal World user applications 474.

In some examples, Normal World OS 472 is responsible for managing the resources for Normal World user applications 474. In some examples, Normal World OS 472 is responsible for managing radio functionality, and layers hierarchically below (i.e., less trusted than) Normal World OS 472 do not have direct access to radio functionality, but instead access radio functionality indirectly via Normal World OS 472.

In some examples, in CPU Normal World user-space, a set of user services 473 are run that are responsible for: booting I/O MCU 480 (with assistance from Secure World runtime 471), booting the radio core 490 (with assistance from Secure World runtime 471), publishing device telemetry to IoT services, publishing diagnostic information to IoT services, receiving and applying software updates from IoT services, and handling reset interrupts from I/O MCU 480 watchdog timers.

In some examples, the CPU Device API internally leverages Normal World user Runtime Services 473, and abstractly provides third-party application Code hosted on the CPU (in Normal World) with access to the following functionality: publishing device telemetry, publishing diagnostic information, communicating with I/O MCU 480, controlling and issuing I/O to peripheral, and application Code. In some examples, product manufacturers and other customers of multi-core processor 445 may author third-party code to execute on the CPU 470 in Normal World. In some examples, the code is able to use the CPU Device API, and may coordinate with I/O runtimes executing on I/O MCU 480.

In some examples, multi-core processor 445 contains two "I/O" MCUs 480 intended for sensing and actuation. In some of these examples, neither I/O MCU 480 contains any ROM code. Instead, in these examples, each I/O MCU 480 contains an 8-byte volatile memory mapped at a particular physical address. When an I/O MCU 480 starts executing, it may fetch its initial instructions from this address. Before each I/O MCU 480 is taken out of reset, the 8-byte volatile memory may be programmed by the CPU 470 to contain a branch to the first instruction of an I/O MCU Loader, XiP from flash.

In some examples, a company can use the I/O MCU 480 microcontrollers to include the code that is on their existing microcontrollers, which may allow a company to replace their existing microcontroller functionality with multi-core processor 445.

In some examples, multi-core processor 445's radio stack executes on radio core 490 programmed by the silicon vendor producing the chip.

While FIG. 4 illustrates a particular example of multi-core processor 445, many other examples of multi-core processor 445 are possible. For instance, the number and type of independent execution environments may vary in different examples. In some examples, multi-core processor 445 has at least two general purpose cores with differing capabilities, so that multi-core processor 445 has heterogeneous cores. The at least two general purpose cores with differing capabilities may be at least a microcontroller and a CPU in one example, while other general purpose cores with different capabilities are used in other examples. The two cores are general purpose in that any suitable code can be run on the cores. For example, the MCU microcontroller and the CPU are general purpose cores, whereas a graphic processing unit (GPU) is not a general-purpose core; rather, a GPU is used to process specific types of calculations, and can runs certain types of executions. While the two cores in multi-core processor 445 are both general purpose and each can run any suitable code, they have differing capabilities from each other. Although the CPU and the MCU microcontroller are both general-purpose cores, the CPU is generally more powerful than the MCU and can execute instructions that the MCU microcontroller cannot. This is but one example of two general purpose cores with differing capabilities. While specific cores are discussed herein, such as the CPU and the MCU, in other examples, other general purpose cores may be employed such as any general purpose CPU, microcontroller, or the like. Also, various quantities of cores may be employed in various examples.

Also, in various examples, different functions may be assigned to different levels of the hierarchy. For instance, in the example of multi-core processor 445 illustrated in FIG. 4, the function of controlling power is assigned to a more trusted level of the hierarchy than the function of managing storage. However, in other examples, the function of managing storage is assigned to a more trusted level of the hierarchy than the function of controlling power.

Multi-core processor 445 may have a secure boot mechanism by which portions of multi-core processor 445 are sequentially booted according to a chain of trust that corresponds to the defense-in-depth hierarchy. The secure boot mechanism may be employed to ensure that only trusted software is booted.

In some examples, when multi-core processor 445 is powered on and its PMU has stable power, the PMU releases the security complex 469 from reset. In some examples, secure MCU ROM 461 is responsible for initializing enough of multi-core processor 445 so that the first piece of software stored in flash can securely execute on the secure MCU 460. In some examples, the ROM code on secure MCU ROM 461 waits for indication that the secure MCU 460 has completed initialization, reads the e-fuse indicating the device's security state, configures PLLs to set a clock frequency, and enables memory mapping of flash (e.g., for all cores).

In these examples, after it has completed this configuration, the code in MCU ROM 461 is responsible for loading and transferring control to secure MCU boot loader 462, which is the first-level boot loader of secure MCU 460. In some examples, the first-level bootloader is stored in flash, both encrypted and signed, at known locations. In some examples, the code in MCU ROM 461 reads the first-level bootloader. In some examples, the ROM code in MCU ROM 461 calculates a hash of the first-level bootloader and verifies the first-level bootloader with a global public key. In some examples, upon verification, the code in MCU ROM 461 causes the first-level bootloader to be loaded into the private SRAM of secure MCU ROM 460 and booted.

In some examples, each multi-core processor 445 has a secret, unique, per-device key. In some examples, the per-device key is an Advanced Encryption Standard (AES) key that is stored in hardware. In some examples, the per-device key can be used in particular authorized ways, including to generate a mutation of the per-device key, but software may be disallowed from reading the per-device key itself, e.g., because the hardware that stores the per-device key does not allow software to read the per-device key. Instead the hardware may allow the particular authorized actions to be performed. In some examples, after booting the first boot loader, secure MCU ROM 460 mutates the per-device key based on the hash of the first boot loader to derive a first mutated key. Secure MCU ROM 460 may cause the first mutated key to be stored in the private SRAM of secure MCU ROM 460. Mutating a key may interchangeably be referred to as key derivation or performing a key derivation function. The first mutated key may be deterministic, e.g., because it is generated from the first boot loader, which, in some examples, does not change during the lifetime of multi-core processor 445.

Next, in some examples, the first bootloader is booted.

The first bootloader may generate a second mutated key based on the first mutated key and a random seed. The second mutated key may be used for the encryption, decryption, signing, and/or validation of the secure key store.

On an initial/first boot of a device, keys, hashes, and other secrets may be determined and stored in the secure key store flash memory, and encrypted and/or signed with the second mutated key. Among other things, the keys used for validation the software stages that boot after the secure MCU runtime may be stored in the secure key store. Accordingly, on initial boot, the secure key store may be created on flash memory and encrypted and/or signed with the second mutated key. In some examples, as discussed above, the random seed is used to derive the second mutated key on the initial boot, and the random seed is stored and is not secret. Accordingly, in some examples, on subsequent boots, the flash memory contains a secure key store that can be decrypted and/or validated with the second mutated key. Also, in some examples, on subsequent boots, the same second mutated key should be generated as the initial boot, because the per-device key should be the same as the initial boot and the hash of the first boot loader should be the same as the initial boot, and the same random seed is used.

In addition to generating the second mutated key as discussed above, the first bootloader may generate one or more additional mutated keys from the first key and a separate corresponding persistent and validated random number. Next, in some examples, the first-level bootloader locates the secure MCU runtime 463 code in flash, reads the secure MCU runtime 463 code, and calculates a hash of the secure MCU runtime 463 code.

In some examples, the first boot loader encrypts and/or signs (using the second mutated key) and stores in flash memory the hash of the secure MCU runtime 463 code in the secure key store in flash memory. In some examples, the first bootloader than finishes execution. The first mutated key is not available after the first bootloader finishes execution until multi-core processor 445 reboots.

In some examples, on subsequent boots after the first boot loader has calculated the hash of the secure MCU runtime 463 code, the first boot loader reads from the secure key store in flash memory and decrypts and/or validates the hash of the secure MCU runtime 463 code stored in the secure key storage. In some examples, the first boot loader then validates secure MCU runtime 463. The validation may include comparing the hash of the MCU runtime 463 code calculated during this boot with the stored hash of the secure MCU runtime 463 code, and using a public key for the secure MCU runtime 463 to validate the signature of the secure MCU runtime 463. In some examples, the public key for the secure MCU runtime 463 is stored in hardware, and the public key for subsequent software stages are stored in the secure key store. In some examples, in response to validation of the secure MCU runtime 463, the first boot loader loads the secure MCU runtime 463 into private SRAM and transfers control to the secure MCU runtime 463 code, causing the secure MCU runtime 463 to be booted. In some examples, each subsequent stage boots sequentially in a similar manner, with each stage being sequentially validated and booted by its parent in the trust hierarchy. For example, the MCU runtime 463 may be responsible for validating and booting the Secure World runtime 471, the Secure World runtime 471 may be responsible for validating and booting the Normal World OS 472, the Normal World OS 472 may be responsible for validating and booting the Normal World user applications 474, and the Normal World user applications 474 may be responsible for validating one or more I/O MCUs 480.

For instance, in some examples, secure MCU runtime 463 calculates a hash of Secure World runtime 471.

In some examples, the Secure World runtime 471 encrypts and/or signs (using the second mutated key) and stores in flash memory the hash of the Normal World OS in the secure key store flash memory.

In some examples, on subsequent boots, the secure MCU runtime 463 calculates a hash of Secure World runtime 471. In some examples, the secure MCU runtime 463 reads from the secure key store in flash memory and decrypts and/or validates the public Secure World runtime public key and the hash of the Secure World runtime 471 code. The secure MCU runtime 463 may then validate Secure World runtime 471. The validation may include comparing the hash of the Secure World runtime 471 calculated during this boot with the stored hash of the Secure World runtime 471 code, and using the secure MCU runtime public key to validate the signature of the Secure World runtime 471. In some examples, in response to validation of the Secure World runtime 471, the secure MCU runtime 463 loads the Secure World runtime 471 into private SRAM and causes the Secure World runtime 471 to be booted.

In some examples, on initial boot, the Normal World OS 472 encrypts and/or signs (using the second mutated key) and stores in flash memory the hash of Normal World user applications 474 from the secure key store in flash memory.

In some examples, on subsequent boots, the Secure World runtime 471 reads from the secure key store in flash memory and decrypts and/or validates the Normal World OS public key and the hash of the Normal World OS 472 code. In some examples, the Secure World runtime 471 then validates Normal World OS 472. The validation may include comparing the hash of the Normal World OS 472 calculated during this boot with the stored hash of the Normal World OS 472 code, and using the Normal World OS public key to validate the signature of the Normal World OS 472. In some examples, in response to validation of the Normal World OS 472, the Secure World runtime 471 loads the Normal World OS 472 into SRAM for the Secure World of CPU 470 and causes the Normal World OS 472 to be booted.

In some examples, the sequential validation and booting continues for the remaining stages needed to be booted in a similar manner, with each stage being sequentially validated and booted by its parent in the trust hierarchy.

During any of the validation stages, validation may possibly fail because the software is not genuine, because the software was corrupted, because an attacker is trying to break into the device, and/or the like. In some examples, if validation fails at any stage, then neither that stage nor any subsequent stages are booted, and any keys, hashes, and/or secrets in memory (SRAM) are erased. Use of the first mutated key may also be restricted, e.g., to use for generation of other key(s). In this example, once the other key(s) are generated, the first mutated key may be erased, e.g., by a clearing of the register in which it is stored.

In some examples, the secure MCU 460 ROM code and the first-level bootloader should not require an update during the device lifetime. Other stages however, may be updated one or more times during the device lifetime, and some may be updated frequently. In some examples, during an update, prior to the update itself, the Secure World first verifies the pending update, and hashes the updated code. In some examples, the secure MCU runtime 463 then updates, in the flash memory, the hashes and keys for any stage that needs to be updated, and generates a signature for any updated stages.

FIG. 4 illustrates one specific example of a multi-core processor for which the secure boot mechanism may be employed, by way of example. The secure boot mechanism may also be employed in other examples of multi-core processors. FIG. 4 illustrates an example that includes a secure MCU with the hardware root of trust, a CPU with a Secure World and a Normal World, and other MCUs with a lower level of trust. In this example, the secure MCU is the first core that is booted, followed by a CPU (with a Secure World execution environment booted before the Normal World execution environment), followed by the other MCUs. Other examples may include other cores and/or other trust hierarchies than the specific example of FIG. 4, which is given by way of example only. In some examples, multi-core processor 445 includes at least two cores including at least a first general purpose core and a second general purpose core in which the first and second general purpose cores have different capabilities, which boots sequentially according to a chain of trust that corresponds to a hierarchy of trust in which one of the general purpose cores is more trusted than the other general purpose core, with the more trusted general purpose core being validated and booted before and the less trusted general purpose core, with the more trusted core validating the less trusted core. The cores need not correspond to the particular cores illustrated in FIG. 4, which is described by way of example only.

Figure 5A:
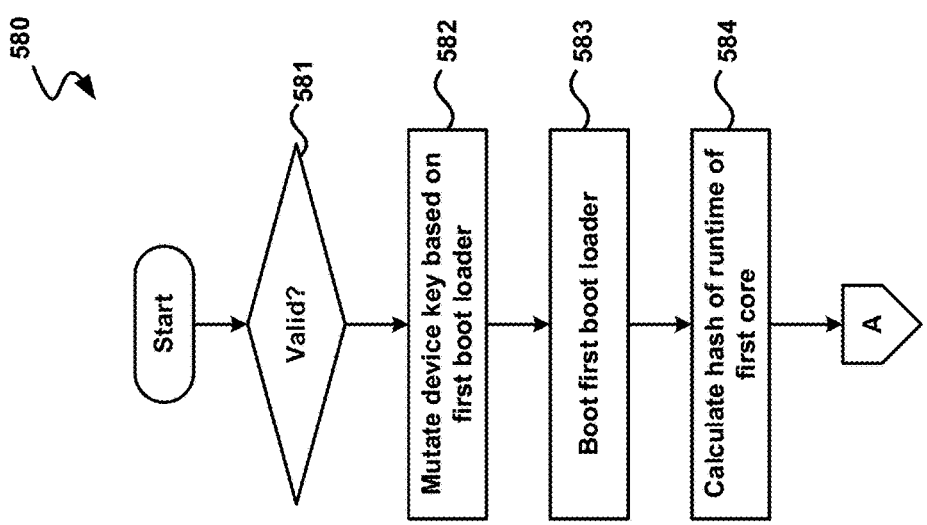
FIGS. 5A-5B are a flow diagram illustrating an example process for a secure boot mechanism for a multi-core processor in accordance with aspects of the present disclosure.
Figure 5B:
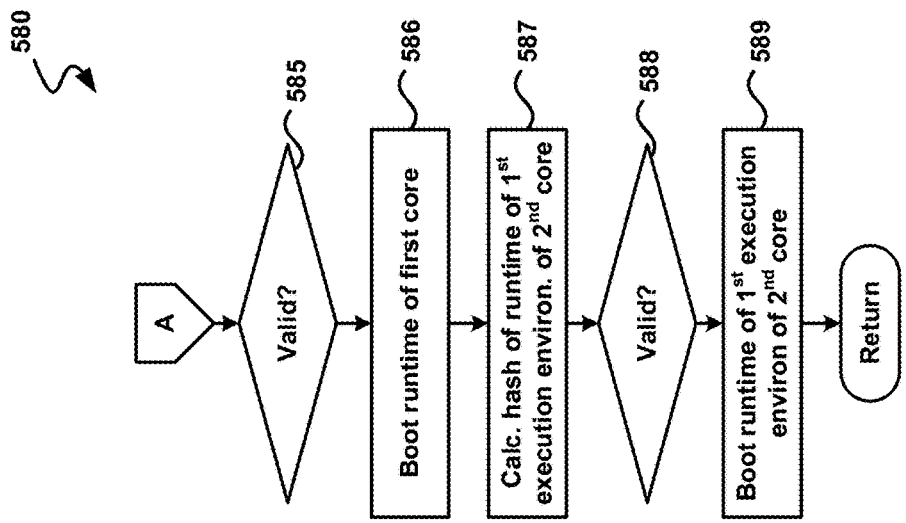

FIGS. 5A-5B are a flow diagram illustrating an example process for a secure boot mechanism for a multi-core processor, that may be performed by the multi-core processor, such as the multi-core processor of FIG. 3 and/or FIG. 4.

In the illustrated example, decision step 581 occurs first. At decision step 581, in some examples, a determination is made, based on a global public key, as to whether a first boot loader is valid. This determination may also include calculating a hash of the bootloader. As shown, upon validation, step 582 occurs next in some examples. At step 582, in some examples, a secret device key is mutated based on a hash of the first boot loader to derive a first mutated key. As shown, step 583 occurs next in some examples. At step 583, in some examples, the first boot loader is booted. As shown, step 584 occurs next in some examples. At step 584, in some examples, a hash of a runtime of a first core is calculated.

As shown, decision step 585 occurs next in some examples. At decision step 585, in some examples, a determination is made as to whether or not the runtime of the first core is validated. In some examples, the runtime of the first core is validated by: validating the calculated hash of the runtime of the first core against a stored hash of the runtime of the first core, and validating a signature for the runtime of the first core.

As shown, upon validation, step 586 occurs next in some examples. At step 586, in some examples, the runtime of the first core is booted. As shown, step 587 occurs next in some examples. At step 587, in some examples, a hash of a runtime of a first execution environment of a second core is calculated. As shown, decision step 588 occurs next in some examples.

At decision step 588, in some examples, the runtime of the first core validates the runtime of the first execution environment. In some examples, the runtime of the first core validates the runtime of the first execution environment of the second core by: validating the calculated hash of the runtime of the first execution environment of the second core against a stored hash of the runtime of the first execution environment of the first core, and validating a signature for the runtime of the first execution environment of the second core.

In some examples, the signature for the runtime of the first execution environment of the second core is based on a third mutated key that is derived from the second mutated key based on the stored hash of the runtime of the first execution environment of the second core. As shown, upon validation, step 589 occurs next in some examples. At step 589, in some examples, the runtime of the first execution environment of the second core is booted.

The process may then proceed to the return block, where other processing is resumed. At each of the decision steps 581, 585, and 588, if the determination is negative, the processing advances to the return block.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:
1. An apparatus, comprising:
a multi-core processor, including a first core, a second core, and at least one memory adapted to store run-time data, wherein the first core is adapted to execute processor-executable code that, in response to execution, enables the multi-core processor to perform actions, including:
deriving a first mutated key from a secret device key and based on a hash of a first boot loader;
deriving a second mutated key from the first mutated key;
calculating a hash of a runtime for the first core;
validating the runtime for the first core based on a signature of the runtime for the first core;
in response to validating the runtime for the first core, booting the runtime for the first core;
calculating a hash of a runtime of a first execution environment for the second core;
using the runtime for the first core to validate the runtime of the first execution environment for the second core based on a signature of the runtime of the first execution environment for the second core, wherein the signature of the runtime of the first execution environment for the second core is based on a key that is retrieved from a secure key store and that is at least one of decrypted or validated with the second mutated key; and
in response to validating the runtime of the first execution environment of the second core, booting the runtime of the first execution environment of the second core.

2. The apparatus of claim 1, wherein the second core is configured to perform actions, comprising:
calculating a hash of an operating system of a second execution environment for the second core;
validating the operating system of a second execution environment for the second core by using the first execution environment for the second core, including:
validating the calculated hash of the operating system of the second execution environment for the second core against a stored hash of the operating system of the second execution environment for the second core; and
validating a signature for the operating system of the second execution environment for the second core; and
in response to validation of the operating system of the second execution environment for the second core, booting the operating system of the second execution environment for the second core.

3. The apparatus of claim 1, wherein the first core and the second core are general purpose cores with differing capabilities, and wherein the first core and the second core are configured to have a defense-in-depth hierarchy in which the first core is above the second core in the defense-in-depth hierarchy.

4. The apparatus of claim 1, wherein the first core is a secure microcontroller, and wherein the second core is a central processing unit.

5. The apparatus of claim 1, wherein the secret key is unique to the multi-core multiprocessor, wherein the secret key is stored in hardware, and wherein the hardware prevents the secret key from being read by software.

6. The apparatus of claim 1, the actions further comprising, if the runtime for the first core is invalid, halting the booting.

7. The apparatus of claim 1, the actions further comprising, if the runtime of the first execution environment for the second core is invalid, halting the booting.

8. The apparatus of claim 7, the actions further comprising, if the runtime of the first execution environment for the second core is invalid, securely deleting the stored hash of the runtime of the first execution environment for the second core from a memory of the at least one memory.

9. A method, comprising:
deriving a first mutated key from a secret device key based on a hash of a first boot loader;
deriving a second mutated key from the first mutated key;
generating a hash of a runtime for a first core;
validating the runtime for the first core, wherein validating the runtime for the first core includes: validating a signature of the runtime for the first core, and validating a hash of the runtime for the first core;
in response to validation of the runtime for the first core, booting the runtime for the first core;
generating a hash of a runtime of a first execution environment for a second core;
validating the runtime of the first execution environment for the second core using the runtime for the first core, wherein validating the runtime of the first execution environment for the second core includes: validating a signature of the runtime of the first execution environment for the second core is based on a key that is retrieved from a secure key store and that is at least one of decrypted or validated with the second mutated key; and
in response to validation of the runtime of the first execution environment of the second core, booting the runtime of the first execution environment of the second core.

10. The method of claim 9, further comprising:
calculating a hash of an operating system of a second execution environment for the second core;
validating the operating system of a second execution environment for the second core, including:
validating the calculated hash of the operating system of the second execution environment for the second core against a stored hash of the operating system of the second execution environment for the second core; and
validating a signature for the operating system of the second execution environment for the second core; and
in response to validation of the operating system of the second execution environment for the second core, booting the operating system of the second execution environment for the second core.

11. The method of claim 9, wherein the first core and the second core are general purpose cores with differing capabilities, and wherein the first core and the second core are configured to have a defense-in-depth hierarchy in which the first core is above the second core in the defense-in-depth hierarchy.

12. The method of claim 9, wherein the first core is a secure microcontroller, and wherein the second core is a central processing unit.

13. The method of claim 9, wherein the secret key is unique to the multi-core multiprocessor, wherein the secret key is stored in hardware, and wherein the hardware prevents the secret key from being read by software.

14. The method of claim 9, further comprising, if the runtime of the first execution environment for the second core is invalid, halting the booting.

15. A processor-readable storage medium, having stored thereon processor-executable code that, upon execution by at least one processor, enables actions, comprising:
deriving a first mutated key by mutating a secret device key based on a hash of a first boot loader;
deriving a second mutated key from the first mutated key;
validating a runtime for a first core;
in response to validation of the runtime for the first core, booting the runtime for the first core;
validating a runtime of a first execution environment for a second core using the runtime for the first core, based at least in part on information retrieved from a secure key storage that is at least one of decrypted or validated with the second mutated key; and
in response to validation of the runtime of the first execution environment for the second core, booting the runtime of the first execution environment for the second core.

16. The processor-readable storage medium of claim 15, wherein validating the runtime for the first core includes:
validating a calculated hash of the runtime for the first core against a stored hash of the runtime for the first core; and
validating a signature for the runtime for the first core.

17. The processor-readable storage medium of claim 15, wherein validating the runtime for the second core includes:
validating a calculated hash of the runtime of the first execution environment for the second core against a stored hash of the runtime of the first execution environment for the first core; and
validating a signature for the runtime of the first execution environment for the second core.

18. The processor-readable storage medium of claim 15, the actions further comprising:
if the runtime of the first execution environment for the second core is invalid, halting the booting.

19. The processor-readable storage medium of claim 15, the actions further comprising:
calculating a hash of an operating system of a second execution environment for the second core;
validating the operating system of a second execution environment for the second core with the first execution environment for the second core by:
validating the calculated hash of the operating system for the second execution environment of the second core against a stored hash of the operating system of the second execution environment for the second core; and
validating a signature for the operating system of the second execution environment for the second core; and in response to validation of the operating system of the second execution environment for the second core, booting the operating system of the second execution environment for the second core.

20. The processor-readable storage medium of claim 15, wherein the first core and the second core are general purpose cores with differing capabilities, and wherein the first core and the second core are configured to have a defense-in-depth hierarchy in which the first core is above the second core in the defense-in-depth hierarchy.

* * * * *